United States Patent
Baba et al.

(10) Patent No.: US 7,162,247 B2
(45) Date of Patent: Jan. 9, 2007

(54) AUTONOMOUS BASE STATION SET UP AND SOFT HANDOFF

(75) Inventors: Shinichi Baba, Morristown, NJ (US); Tadahiko Maeda, Summit, NJ (US)

(73) Assignee: Toshiba America Research, Inc., Morristown, NJ (US)

( * ) Notice: Subject to any disclaimer, the term of this patent is extended or adjusted under 35 U.S.C. 154(b) by 733 days.

(21) Appl. No.: 09/835,855

(22) Filed: Apr. 17, 2001

(65) Prior Publication Data

US 2002/0151308 A1 Oct. 17, 2002

(51) Int. Cl.
*H04Q 7/30* (2006.01)
*H04Q 7/20* (2006.01)

(52) U.S. Cl. .................. 455/446; 455/448; 455/550.1; 455/561; 455/434; 455/422.1; 455/438; 455/524

(58) Field of Classification Search ............... 455/446, 455/432.1, 436, 437, 438, 439, 440, 441, 455/442, 443, 561, 444, 445, 450, 457, 452, 455/550.1, 552.1, 500, 517, 422.1, 403, 434, 455/9, 515, 524, 525, 67.1; 370/331, 332
See application file for complete search history.

(56) References Cited

U.S. PATENT DOCUMENTS

| | | | | |
|---|---|---|---|---|
| 5,724,665 | A * | 3/1998 | Abbasi et al. | 455/561 |
| 6,064,890 | A * | 5/2000 | Hirose et al. | 455/513 |
| 6,125,280 | A * | 9/2000 | Grandhi et al. | 455/446 |
| 6,405,048 | B1 * | 6/2002 | Haartsen | 455/464 |
| 6,628,632 | B1 * | 9/2003 | Dolan | 370/332 |

OTHER PUBLICATIONS

Internet printout: http://rfc.sunsite.dk/rfc1134.html, "Point-to-Point Protocol: A Proposal for Multi-Protocol Transmission of Datagrams Over Point-to-Point Links", dated Apr. 23, 2004.
3rd Generation Partnership Project 2 "3GPP2", "Data Service Options for Spread Spectrum Systems: cdma2000 High Speed Packet Data Service Option 33", Version 2.0, dated Aug. 21, 2000.
Internet printout: http://rfc.sunsite.dk/rfc/rfc768.html, User Datagram Protocol, dated Apr. 23, 2004.
Internet printout: http://rfc.sunsite.dk/rfc/rfc793.html, "Transmission Control Protocol DARPA Internet Program Protocol Specification", dated Apr. 23, 2004.
Internet printout: http://rfc.sunsite.dk/rfc/rfc2003.html, "IP Encapsulation within IP", dated Apr. 23, 2004.
Internet printout: http://rfc.sunsite.dk/rfc/rfc768.html, User Datagram Protocol, dated Apr. 23, 2004.
Internet printout: http://rfc.sunsite.dk/rfc/rfc2004.html, "Minimal Encapsulation wthin IP", dated Apr. 23, 2004.
Internet printout: http://rfc.sunsite.dk/rfc/rfc2784.html, "Generic Routing Encapsulation (GRE)", dated Apr. 23, 2004.

(Continued)

*Primary Examiner*—Keith Ferguson
(74) *Attorney, Agent, or Firm*—Banner & Witcoff Ltd

(57) ABSTRACT

The invention relates to a system and method for autonomously setting up a base station. The new base station monitors signals from other base stations to determine how it relates to the other base stations. Next, the base station forms and transmits a list of other base stations with suggested handoff rankings to other base stations. Embodiments include source assisted soft handoff including the source base station requesting and forwarding information to mobile stations being handed off to a target base station.

20 Claims, 14 Drawing Sheets

OTHER PUBLICATIONS

K. Elsayed et al., "MPLS: The Magic Behind the Myths", IEEE Communications Magazine, Jan. 2000.

Internet printout: http://rfc.sunsite.dk/rfc/rfc2002.html, "IP Mobility Support", dated Apr. 23, 2004.

Ramjee et al., "IP-Based Access Network Infrastructure for Next-Generation Wireless Data Networks", IEEE Personal Communications, Aug. 2000.

Campbell et al., "Design, Implementation, and Evaluation of Cellular IP", IEEE Personal Communications, Aug. 2000.

3$^{rd}$ Generation Partnership Project 2 "3GPP2", "Data Service Options for Spread Spectrum Systems", Version 2.0, dated Aug. 21, 2000.

* cited by examiner

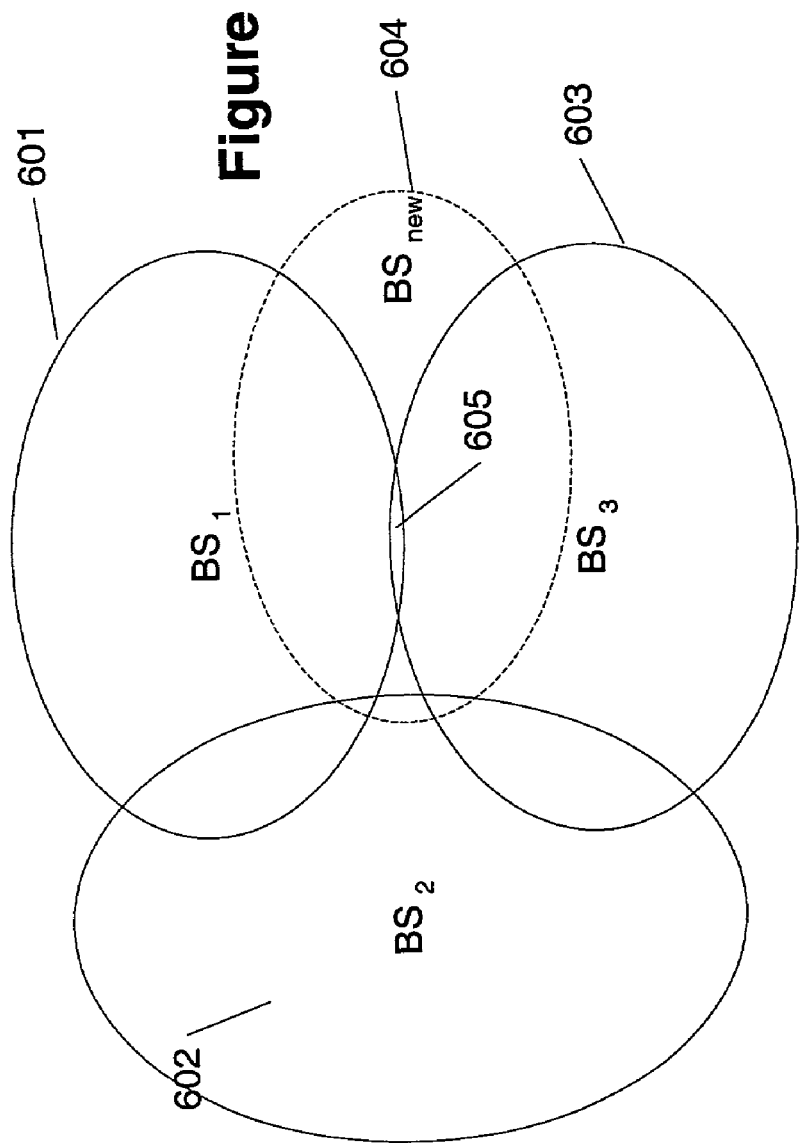

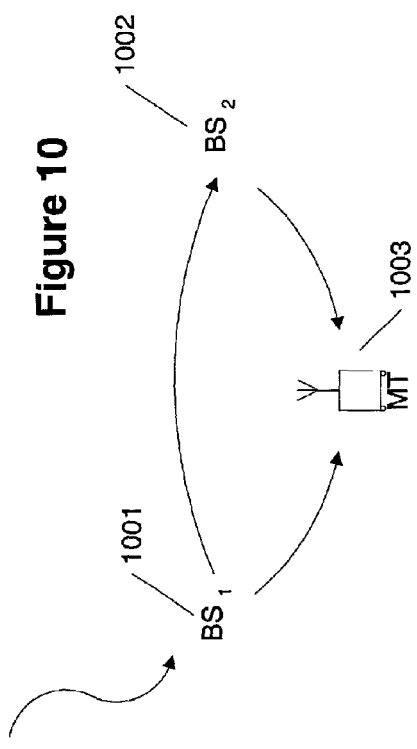
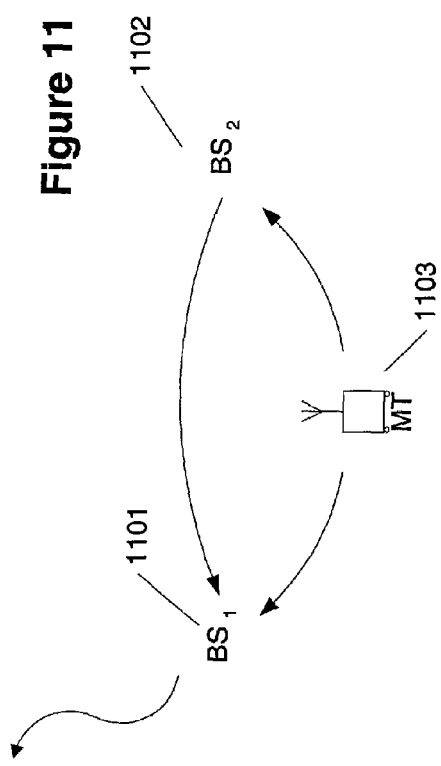

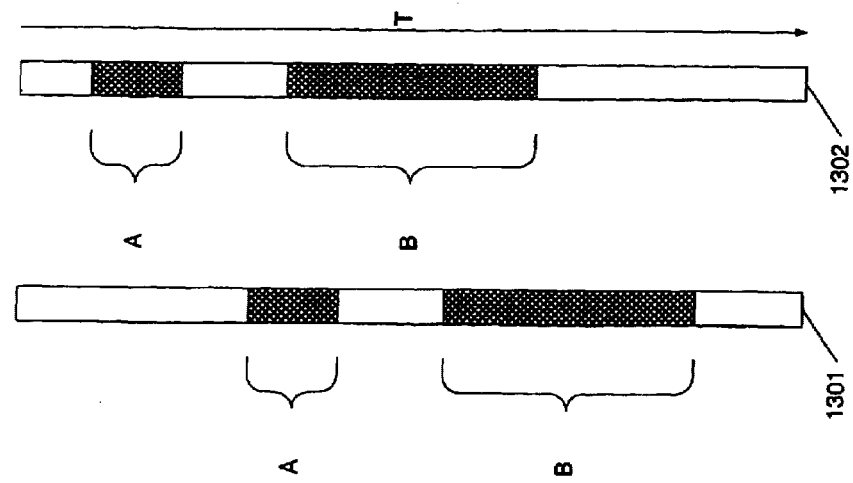
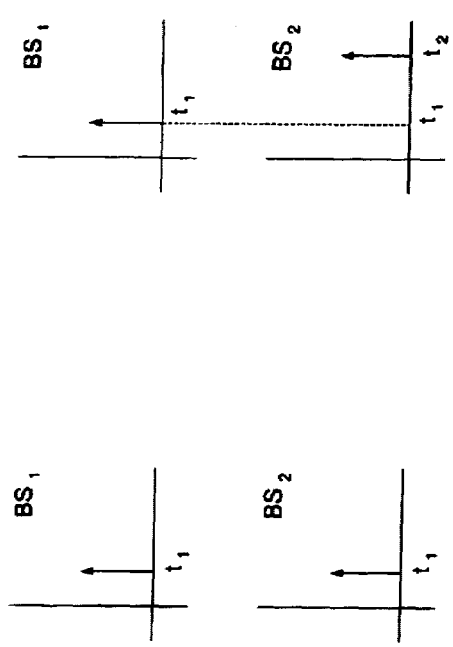

AUTONOMOUS BASE STATION SET UP AND SOFT HANDOFF

1. RELATED APPLICATION INFORMATION

This application is related to U.S. patent application Ser. No. 09/822,822, entitled "Soft Handoff in IP-Based CDMA Networks By IP Encapsulation" filed Apr. 2, 2001. This application is also related to U.S. patent application Ser. No. 09/504,106, entitled "Method And Apparatus For Enabling And Monitoring Mobile Communication Across Platforms", filed Feb. 14, 2000. The contents of these applications are expressly incorporated herein by reference for any essential subject matter.

2. BACKGROUND OF THE INVENTION

2.1 Technical Field

The invention relates to mobile communication devices. More particularly, the invention relates to base station set up and soft handoff.

2.2 Related Art

Cellular base stations form an important part of wireless communications. Wireless base stations, known in the art, have processors along with wired and wireless receivers and transmitters that receive and transmit information between mobile stations and base station controllers. Mobile terminals use transmitters and receivers, as known in the art, to transmit and receive information to base stations. The average cell size for a cellular base station is between two and three km in diameter. As the number of cellular users increases, base stations become strained to keep up with the demand for bandwidth from new users. With the use of web-enabled phones and other communication devices connected to IP networks, greater amounts of information will need to flow through base stations to users' communication devices. With large cell sizes, an increasing amount of data transactions is placed on the base stations, causing bottlenecks in information flow as well as dropped calls or connections with users.

Further, additional strain will be placed on the base station controller that coordinates handoff between adjoining base stations. In GSM systems, for example, the interface between a base station controller (BSC) and a main switching center (MSC) (A-interface) is specified in the following GSM specifications: GSM 08.01, 0802, 0804, 0806 0808, and 0820. Also the interface between the BTS and the BSC (the Abis-interface) is specified in other GSM specifications. Other cellular systems, like CDMA, also use similar interfaces for handoff. All use centralized control. These were designed for macro sized base stations where handoff does not happen often because of the size of coverage areas. However, with handoffs occurring at a high rate, current interfaces show inability to handle high volume handoffs efficiently. This is because soft handoff requires the exchange of received or transmitted signals with adjacent base stations. These signals all need to be passed through the BSC or MSC, which may be located distant from the actual BSs and MTs, and need to handle all hand off requests. Furthermore, if the existing methods described above are applied directly over IP (Internet Protocol) networks, it will be difficult for a mobile station to synchronize the data it receives from multiple base stations during a handoff. This is because it will be difficult for an IP network to deliver data from a distant BSC or MSC via multiple BSs to a mobile station while still being able to meet the strict timing requirements for data synchronization at the mobile station. This is especially true when the network load is heavy. Loss of synchronization will lead to forced termination of handoff.

FIG. 12 shows base stations 1202, 1203, and 1204 being controlled by base station controller (BSC) 1201. If a mobile station travels from the area covered by base station 1202 to the area covered by the base station 1203, BSC 1201 will receive and coordinate the handoff requests between the various entities. All coordination involves BSC 1201. As the number of base stations increase, the load on the BSC 1201 will increase, creating another bottleneck for information flow.

One solution is to decrease the capacity of each base station while increasing the number of base stations. These base stations (also referred to as pico base stations) have a much smaller coverage area yet provide a greater effective bandwidth for receiving and transmitting large amounts of information. A difficulty in bringing online a new base station is the time required to properly set up a base station in relation to other stations. Manual programming of base stations is prone to errors and can be inaccurate if performed during a time when the various base stations are not utilized in a normal fashion (e.g., at 4:00 AM on a weekday). Further, programming base stations without taking into account a specific topography of an area may lead to incorrect (at times nonfunctional) results. If pico base stations are to become commonplace, a more efficient installation process is needed.

The above problems may be summarized as follows: 1) the inability to set up newly installed base stations automatically, 2) the loss of flexibility for installation of new base stations, and 3) the inability to coordinate handoff using primarily source and target base stations.

3. SUMMARY

A system and method for providing an efficient automatic and autonomous set up of base stations in network of other stations is provided. Also provided is a system and method for handoff being coordinated by the source and target base stations. Further, to ensure that information is transmitted and received properly, the system and method use diversity gain when receiving correctly receive information.

In one aspect, the invention may be defined as a system for setting up base stations in relation to existing base stations comprising a first base station having a receiver, a processor, and a transmitter, wherein said receiver receives signals from existing base stations, said processor processes adds said existing base stations to a list of base stations, and said transmitter transmits said list to other base stations.

In another aspect, the invention includes a source base station and a target base station wherein a mobile station transmits an identity of the target base station to the source base station, wherein the source base station obtains information from the target base station, and wherein the source base station transmits at least some of the information to the mobile station.

In a third aspect, the invention may be defined as a method for setting up base stations comprising the steps of determining neighboring base stations, monitoring signals associated with the base stations, determining how the signals compare with a signal generated by the base station, ordering the base stations into a list, and transmitting the list to the base stations.

In a fourth aspect of the invention, the invention may be defined as a method for performing soft handoff comprising the steps of receiving an identity of a target base station from a mobile station at a source base station, requesting information regarding the target base station, receiving information regarding the target base station, transmitting at least a portion of the information to the mobile station, receiving an indication of successful handoff from the mobile station, transmitting a source base station title to the target base station.

In other aspects, the invention is applied to mobile station that communicate with base stations.

The invention may be implemented in an IP network. Other network systems may be used, as the base station setup method described herein is independent of whether the network is an IP network or not. The present invention is applicable to all networks that use autonomous base stations.

These and other aspects of the invention will be apparent from the following drawings and description.

4. BRIEF DESCRIPTION OF DRAWINGS

FIG. 1 shows base stations and mobile stations in accordance with embodiments of the present invention.

FIGS. 2A–C show mobile stations crossing between two base stations in relation to a new base station in accordance with embodiments of the present invention.

FIGS. 6A–D show arrangements of existing base stations and new base stations in accordance with embodiments of the present invention.

Figure 7A:
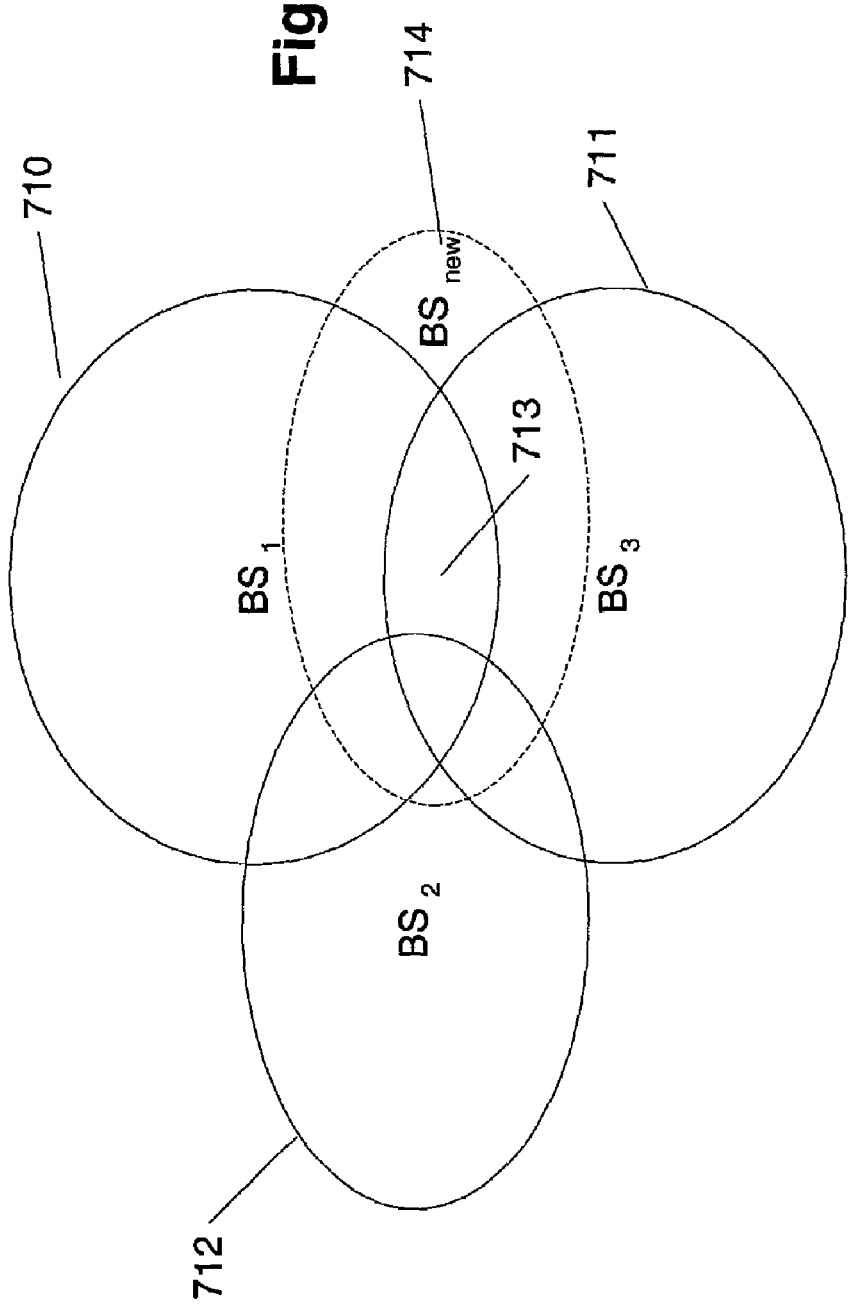
Figure 7C:
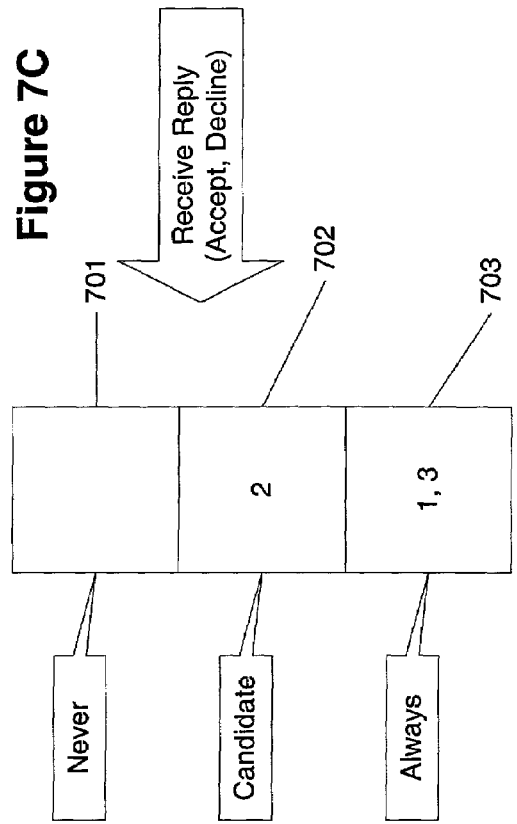
Figure 7B:
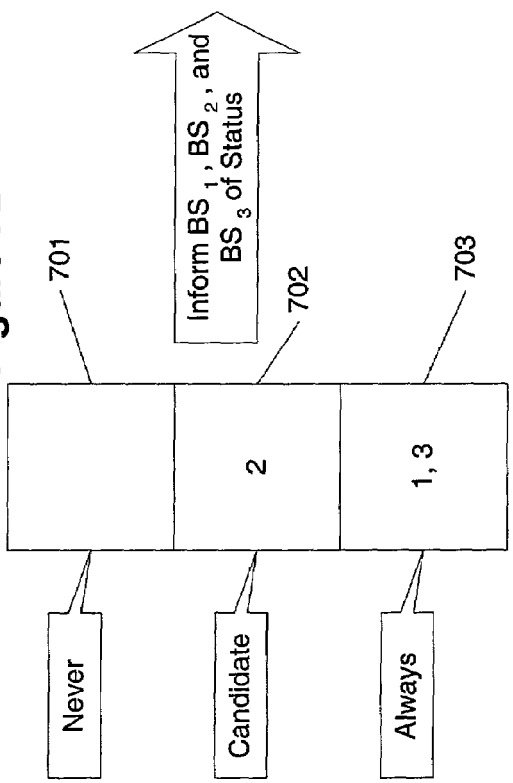

FIGS. 7A–C show an alternative arrangement of base stations and categorization of the base stations as realized by a new base station in accordance with embodiments of the present invention.

Figure 8A:
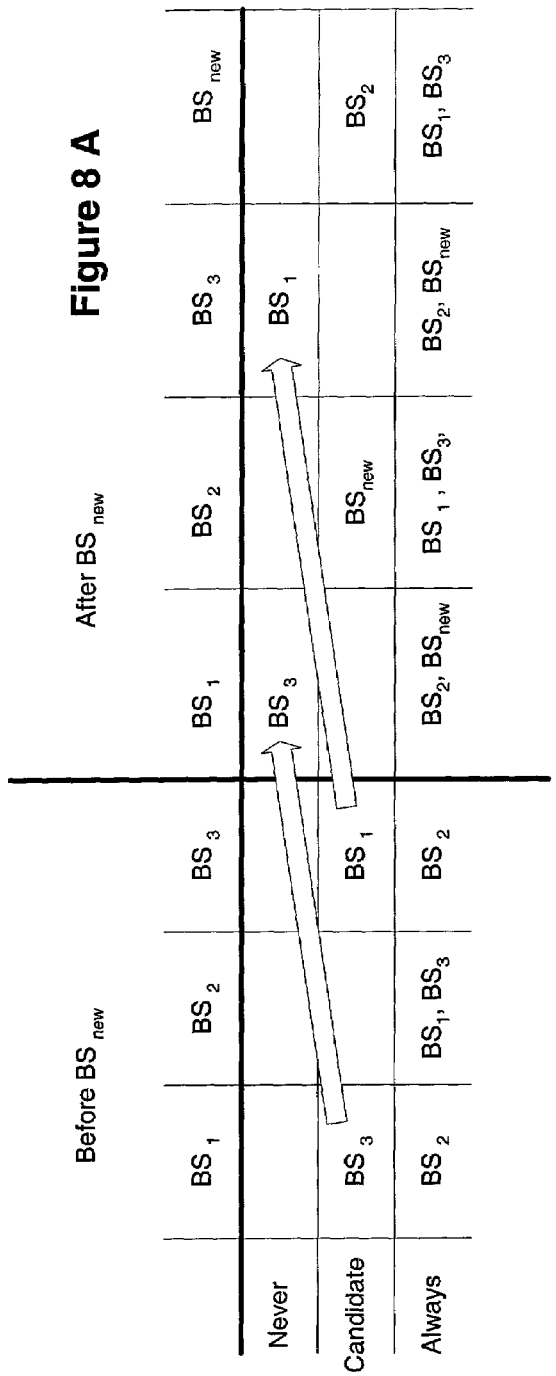
Figure 8B:
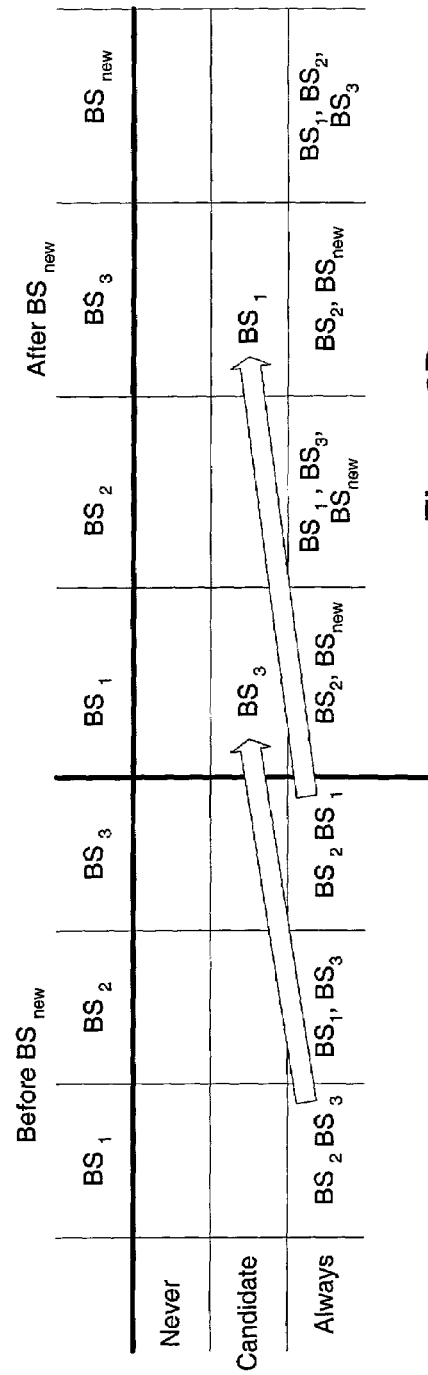

FIGS. 8A and 8B shows relationships between base stations in accordance with embodiments of the present invention.

Figure 9:
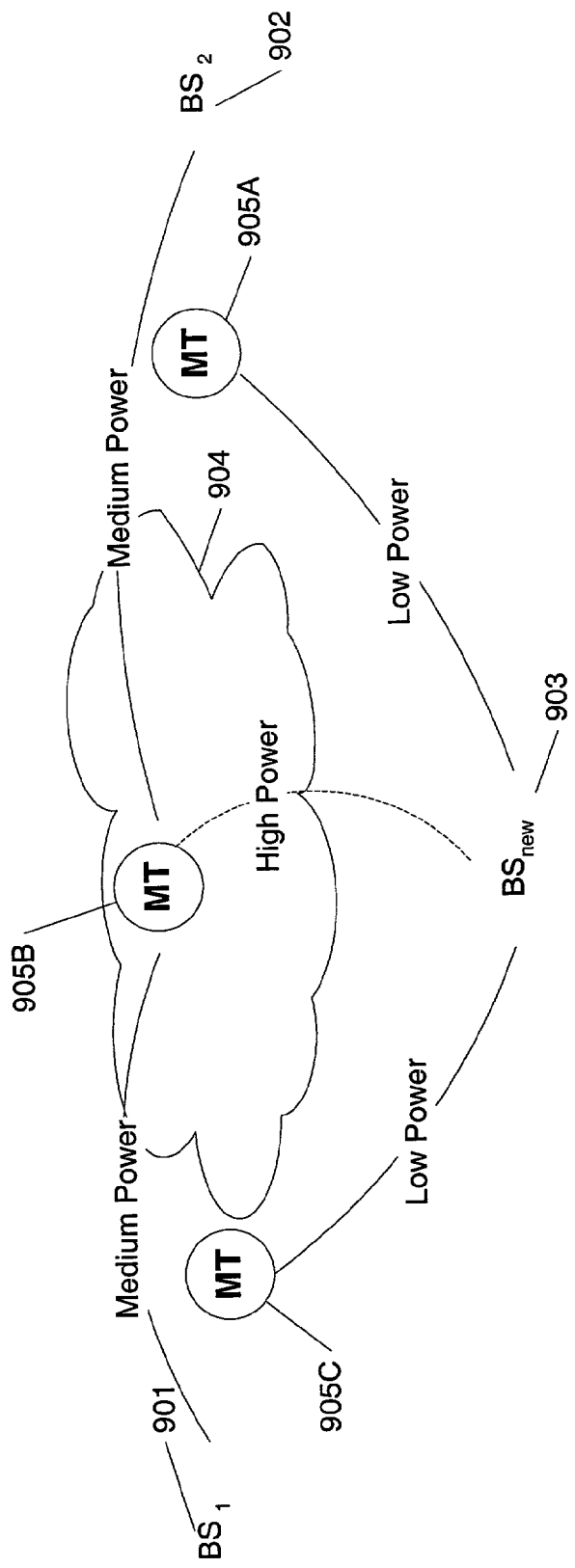

FIG. 9 shows a mobile station in relation to base stations in accordance with embodiments of the present invention.

FIG. 10 shows forward path diversity in accordance with embodiments of the present invention.

FIG. 11 shows reverse path diversity in accordance with embodiments of the present invention.

Figure 12:
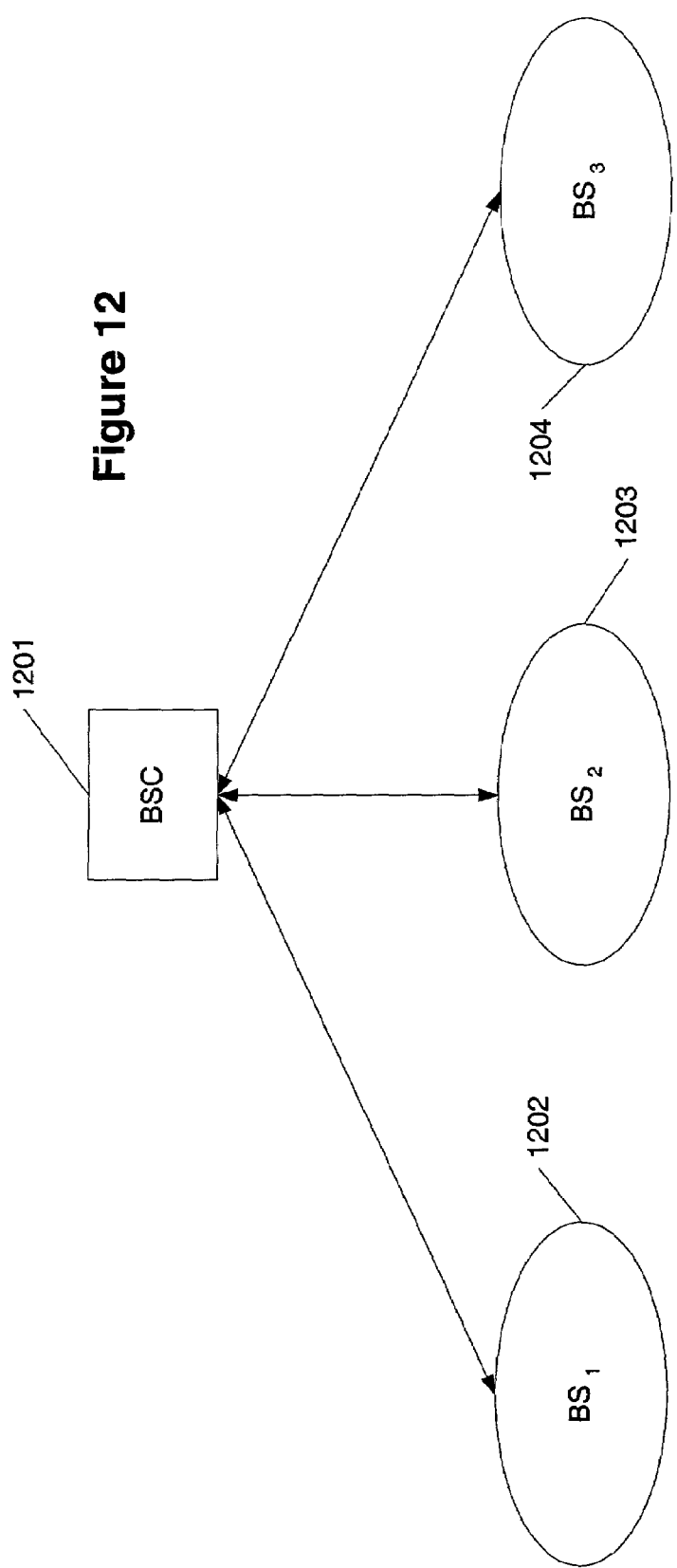

FIG. 12 shows conventional base stations and a base station controller.

FIGS. 13A to 13C show various diversity signaling processes in accordance with embodiments of the present invention.

5. DETAILED DESCRIPTION

The present invention relates to autonomous set up and operation of a base station.

The autonomous set up of the base station includes three phases. The first phase includes monitoring the power level required to connect and/or service at least one of the neighboring base stations or mobile stations being handed off between base stations. The monitoring occurs with a receiver (known in the art) of the base station. Alternatively, the new base station may monitor the pilot signals transmitted from the other base stations. Next, the new base station compares the power levels (or other measured signals) to determine when it should receive mobile stations from other base stations. In other words, the new base station determines when it will be a candidate for handoff from other base stations. Likewise, it determines which base stations it will hand off mobile stations to as well. Third, the new base station transmits its suggested order to other base stations for approval.

As to the soft handoff between base stations, one embodiment includes having a mobile station monitor pilot signals from neighboring base stations and keeps track of the neighboring base stations. When the pilot signal of a base station (here, a target base station) exceeds a predetermined threshold, the mobile station alerts its source base station of target base station. Next, the source base station negotiates with the target base station to obtain its identification information. At least part of this identification information is later passed to the mobile station. The source base station begins to transmit incoming data both to the target base station and to the mobile station. Likewise, when transmitting information back to the base station, the mobile station transmits its information to both the source base station and the target base station. The target base station then forwards the received information back to the source base station. The mobile station (over the forward link) and the source base station (over the reverse link) compare the received information to ensure that the desired information has been received. By the fact that receiving station (the mobile station and the base station) has the option of choosing between two data streams containing the same underlying information, the receiving station has diversity gain.

Figure 1:
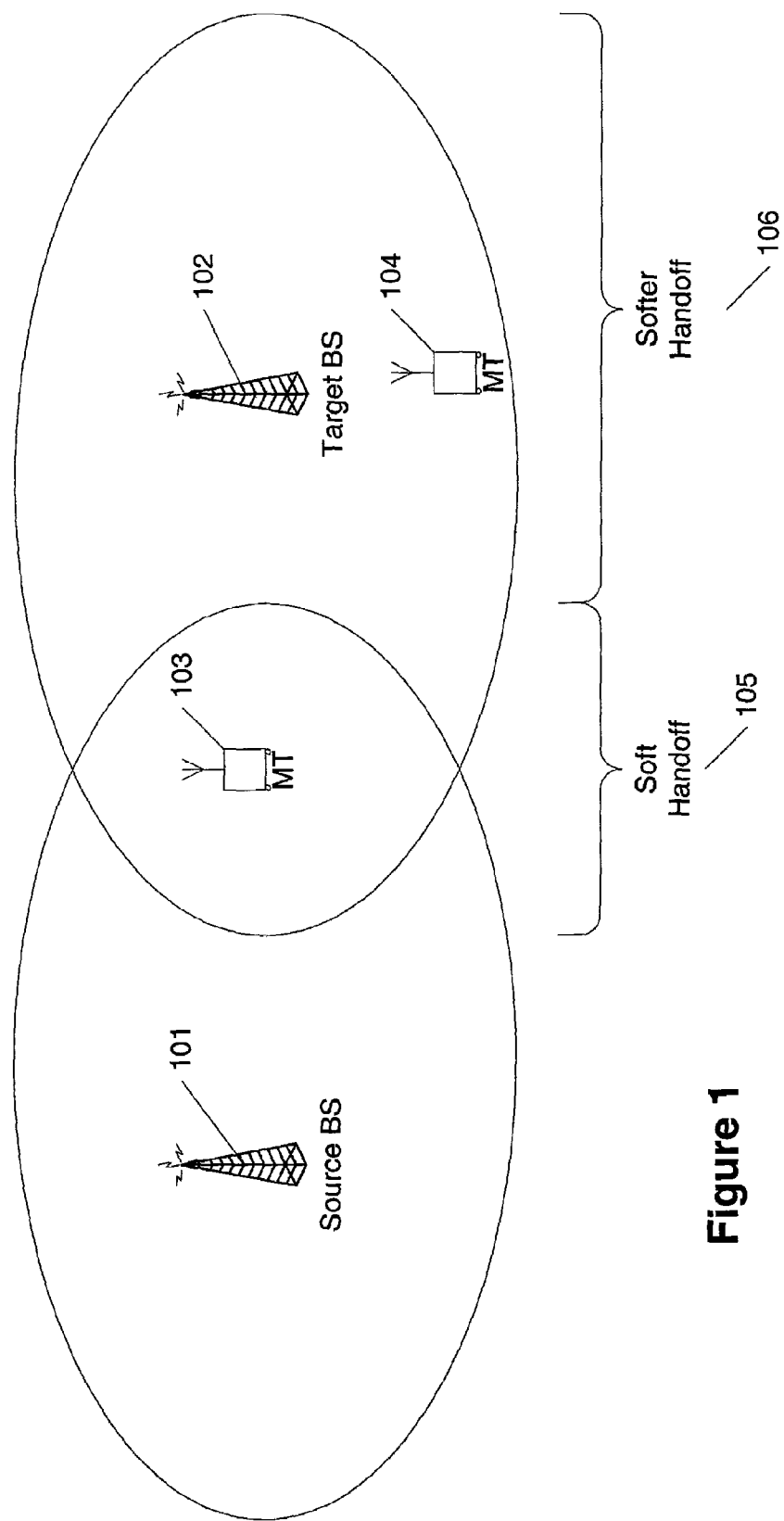

FIG. 1 shows a source base station 101 and target base station 102. Mobile station 103 is currently being serviced by the two base stations 101 and 102 as it moves between the coverage areas of the base stations. For purposes herein, being serviced by two base stations at the same time in an overlapping area for the purpose of handing off the mobile station from the source base station to the target base station is referred to as "soft handoff." "Softer handoff" may be referred to as handoffs between cells handled by the same base station. Here, while two base stations are active during soft handoff, only one base station (the base station handling the two cells) is active during softer handoff.

After the initial installation of a new base station ($BS_{new}$), the new base station begins monitoring radio frequencies to determine how it relates to other base stations and mobile stations that communicate with them. It is appreciated that base stations generally include transmitters, receivers and processors for processing signals as are known in the art. For example, the new base station may start monitoring the pilot signals from surrounding base stations. Each base station knows all adjacent or neighbor base stations by monitoring either up-link or down-link. Each base station makes the list of base stations for soft hand-off and their IP addresses. After finding all adjacent base stations, a new base station monitors the power control information for selected mobile stations.

Figure 2A:
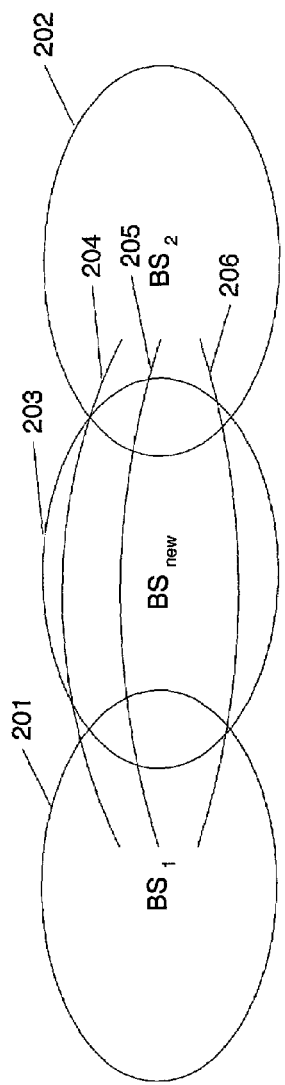
Figure 2B:
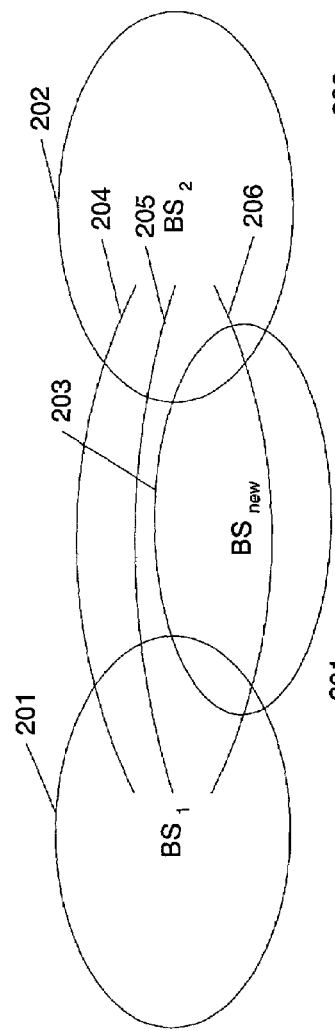
Figure 2C:
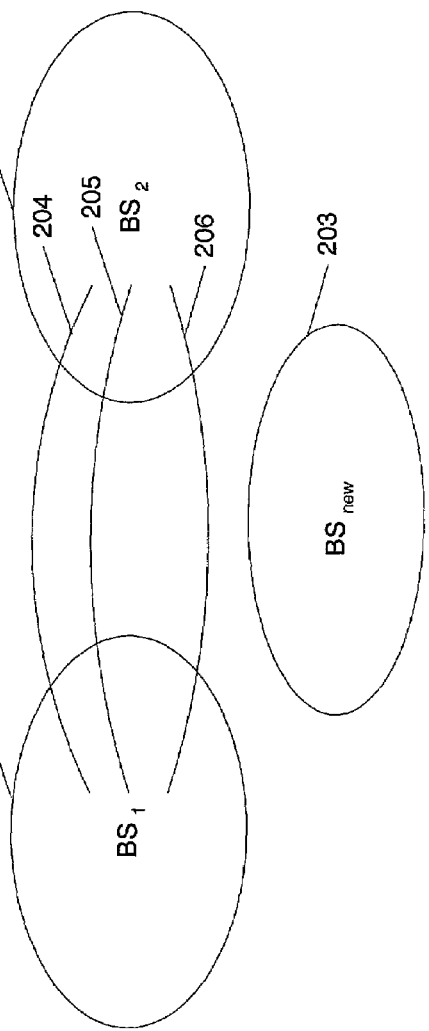

FIGS. 2A through 2C show the movement of mobile stations between base station $BS_1$ 201, base station $BS_2$ 202, and how they interrelate with the new base station $BS_{new}$ 203. The monitoring performed by the new base station 203 may be in receiving signals from the mobile stations directly or in receiving signals from the base stations 201 and 202 that are directed to the various base stations. The monitoring may monitor power levels, power control signaling, noise levels, check sums, requests for handoffs, and the like. The monitoring may also monitor the signal to noise ratio, bit error rate, delay speed, packet loss, and any other known aspects to evaluate the quality of the transmissions.

FIGS. 2A through 2C show mobile stations tracing paths 204, 205 and 206. The position of the mobile stations may be determined by a number of methods. One method includes triangulating the position of the mobile station by determining the power needed to communicate with the mobile station from each base station and use this figure to determine the location of the mobile station. Alternatively, one may determine the propagation delay to and/or from each base station. Further, at least one method does not include determining the actual position of the mobile but only compares the strengths of the signals (as will be discussed below).

Here, in FIG. 2A, all three paths pass through the service coverage of the new base station 203. In FIG. 2B, only path 206 passes through the service coverage of the new base station 203. In FIG. 2C, none of paths pass through the territory served by the new base station 203.

The three types of relationships between the new base station 203 and base stations 201 and 202 exist. First, as shown in FIG. 2A, the new base station 203 is always a handoff potential for base stations 201 and 202. Second, as shown in FIG. 2B, the new base station 203 is a candidate for handoff between base stations 201 and 202. Third, as shown in FIG. 2C, the new base station 203 is never a candidate for handoff between base stations 201 and 202.

To determine which group a new base station should be (active, candidate, or never (also referred to as no-soft handoff)), the new base station compares the signals it received (as well as the signals it may have used to communicate with the mobile station). The following example uses power levels. Other signal comparisons may be used including but not limited to correlating the sync portion of the transmissions and the loading factor of the base stations.

If the required power of the new base station is lower then that of base station 201, the new base station starts the procedure to register the new base station to a table of soft-hand off at base station 201. If the required power of the new base station is also lower than that of base station 202, the similar registration procedure is performed. The new base station requests to put its name on the list for soft-handoff at the base station 201. The base station 201 returns the category of the new base station 203.

For the first situation, the new base station requests to list its name as active category at base station 201. If the base station 201 wants to conduct soft hand off with the new base station 203, the base station 201 lists the name of the new base station on an active category list and returns the category status to the new base station 203. Then, the new base station 203 confirms that it will conduct soft hand off with the base station 201. At this point, the new base station 203 and the base station 201 may agree on a predetermined starting time to begin soft handoff between the base station 201 and the new base station 203. Also, the transmission power of the new base station 201 may be increased slowly so as to not disrupt the equilibrium of the reset of the network. For example, CDMA systems function on the assumption that the base stations work under power control and use timers to control the power of each transmitter. Changing the power level at one base station (or any other station) quickly can disrupt the rest of the system as each element in the system attempts to compensate for the new power level.

Figure 3:
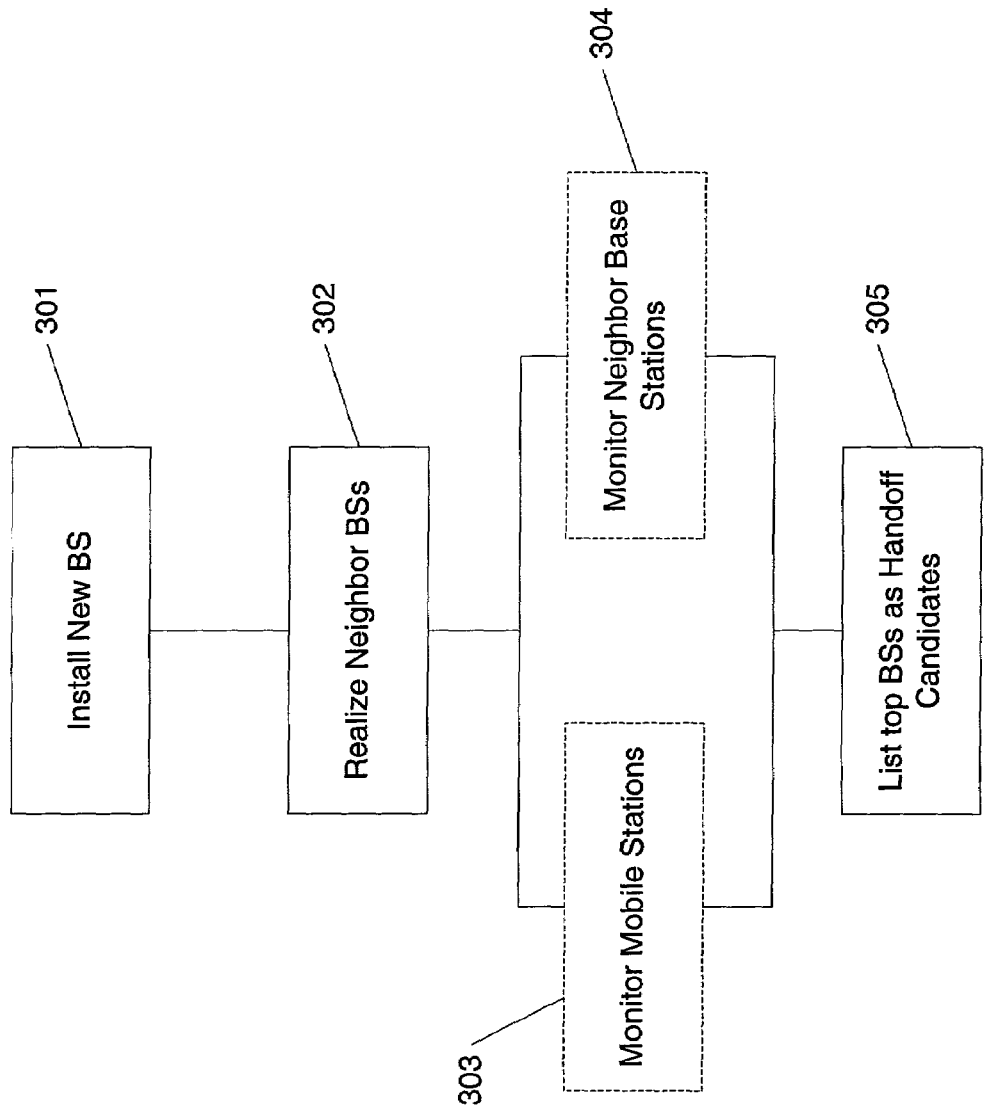
FIG. 3 shows a method for setting up a new base station in accordance with embodiments of the present invention.

FIG. 3 shows a method for setting up a new base station in accordance with embodiments. In step 301, the new base station is installed. In step 302, the new base station determines the identities of the surrounding base stations. This determination may be made on the existence of pilot signals, broadcasting signals, and information received from over a wired network.

Next, the new base station monitors mobile stations 303 or monitors neighbor base stations 304. Both may be performed or only one. Further, the new base station may monitor the stations or base stations indirectly by contacting other base stations and request information regarding the desired signals or by contacting the mobile station or other mobile stations and retrieve information from them. Finally, the new base station lists the neighboring base stations as candidates in step 305.

FIG. 6A shows an arrangement of existing base stations and new base stations in accordance with embodiments of the present invention. Three base stations are old including $BS_1$ 601, $BS_2$ 602, and $BS_3$ 603. New base station $BS_{new}$ 604 is to be added to the grouping of 601–603. Here, the coverage areas of base stations $BS_1$ 601 and $BS_3$ 603 is small (represented by area 605).

Figure 6D:
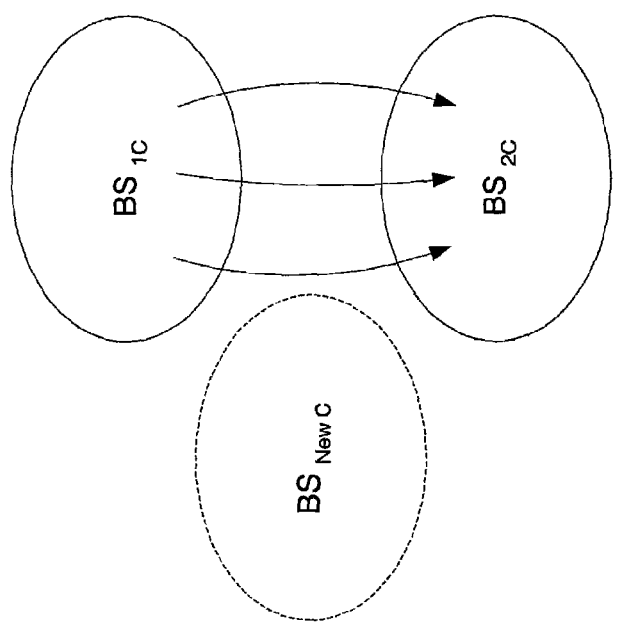
Figure 6C:
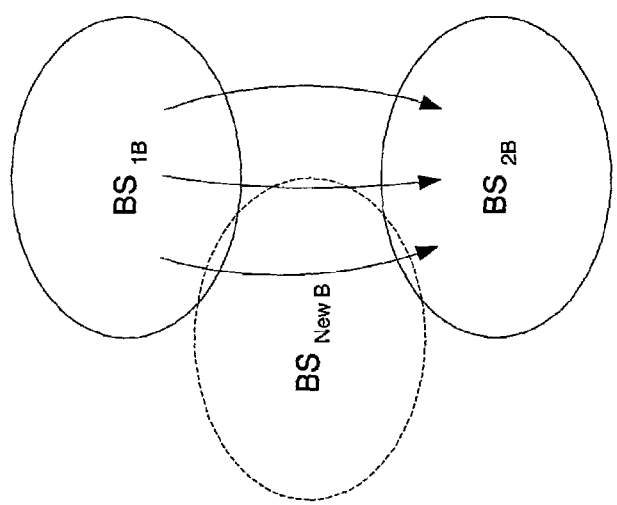
Figure 6B:
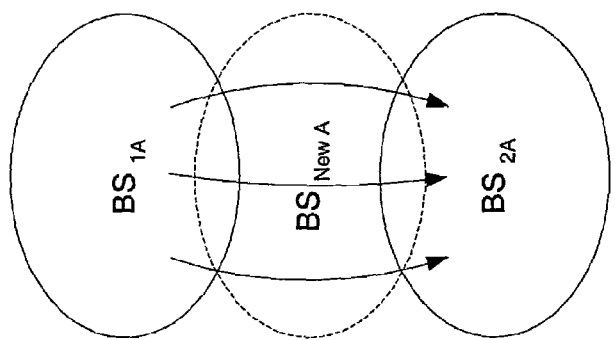

FIGS. 6B–C show base stations $BS_{1A}$, $BS_{1B}$, and $BS_{1C}$ with mobile stations leaving their coverage areas. The mobile stations are traveling to base stations $BS_{2A}$, $BS_{2B}$, and $BS_{2C}$, respectively. In the Figures, the mobile stations always pass through $BS_{new\ A}$, sometimes pass through $BS_{new\ B}$, and never pass through $BS_{new\ C}$. Accordingly, the handoff of the mobile stations as handing off between the base stations is represented as "always" for FIG. 6A, "candidate" or "sometimes" for FIG. 6B and "never" for FIG. 6C.

FIGS. 7B and 7C show categories of existing base stations as realized by a new base station in accordance with embodiments of the present invention. To set up the different categories of base stations as shown in FIG. 6A, the system monitors the paths of mobile stations. The paths of the mobile stations are analyzed in reference to FIGS. 2A–2C (or FIGS. 6B–D as mentioned above). In FIGS. 2A–2C, new base station $BS_{new}$ creates three categories of base station hand off candidates. By detecting the signals from $BS_1$, $BS_2$, and $BS_3$ (directly or indirectly), $BS_{new}$ is able to determine how it relates to the other base stations. For example, for mobile stations moving directly between $BS_1$ and $BS_3$ pass through $BS_{new}$ like the paths shown in FIG. 2A. Accordingly, $BS_{new}$ will always be a possible handoff choice for $BS_1$ and $BS_3$. It is noted that some may pass through $BS_2$ on their way to $BS_3$. In this instance, the paths are considered in two steps: from $BS_1$ to $BS_2$ and from $BS_2$ to $BS_3$.

Monitoring of the mobile stations may be realized directly through monitoring the location of the signals generated by or sent to the mobile stations or indirectly through other known methods including monitoring network traffic associated with the mobile stations.

For mobile stations moving between $BS_1$ and $BS_2$, the paths between these base station may follow routes like that of FIG. 2B, in which some of the mobile stations pass through the territory covered by $BS_{new}$ and others do not. A similar analysis may be made for transitions between $BS_2$ and $BS_3$.

FIGS. 7B and 7C show the schema created by $BS_{new}$ from FIG. 6A. List 701 is the "never" or "no candidate" handoff category relating to mobile stations following the paths of FIG. 2C. List 702 is the "candidate" handoff category relating to mobile stations in which $BS_{new}$ is adjacent other base stations but does not receive all traffic between them (for example, for mobile stations following paths shown in FIG. 2B). Here, base station $BS_2$ is included in this candidate category. This is because of the small overlap between $BS_{new}$ and $BS_2$. List 703 is the "always" handoff category in which BS $BS_{new}$ is always considered for handoff.

The list of FIG. 7B is transmitted to other base stations. The other base stations reply in FIG. 7C to the suggested list. The other base stations may accept, decline or offer other suggestions to the list. Once accepting the list from $BS_{new}$, the other base stations need to modify their lists to comport with the changes of the list in FIG. 7B. For example, $BS_1$ would move $BS_3$ into category 701. Similarly, $BS_3$ would move $BS_1$ into category 701.

Determination of which category base stations to be added to may be determined as follows. It will be appreciated that other algorithms may be used and are considered within the scope of the invention. For mobile stations transitioning between base stations $BS_A$ and $BS_B$, if the power level P to communicate with a given mobile station during handoff for $BS_{new}$ is ever less than that P for $BS_A$, then add $BS_A$ to the "candidate" list 702. This may be represented as follows:

If $P(BS_{new})<$or$=P(BS_A)$, then add $BS_A$ to "candidate".

Also, if $P(BS_{new})<P(BS_A)$ for all mobile station handoffs then add $BS_A$ to "always".

Further, if $P(BS_{new})>P(BS_A)$ for all mobile station handoffs then add $BS_A$ to "never".

FIG. 8A shows relationships between base stations in accordance with the embodiment of FIG. 6A. Before $BS_{new}$, base station 1 has base station 3 in its candidate list and base station 2 in its always list. Base station 2 includes base stations 1 and 3 in its active list. Base station 3 includes base station 1 in its candidate list and base station 2 in its active list. After $BS_{new}$, base station 1 has base station 3 in its never list and base stations 2 and new in its always list. Base station 2 includes base stations 1 and 3 in its active list and base station new in its candidate list. Base station 3 includes base station 1 in its never list and base stations 2 and new in its active list. Base station new includes base stations 1 and 3 in its active list and base station 2 in its candidate list. These relationships and movements may be derived through applying the conventions of FIGS. 2A–C and 6B–D.

FIG. 7A shows a different base station configuration than that shown in FIG. 6A. In FIG. 7A, base stations $BS_1$ 710, $BS_2$ 712, $BS_3$ 711, and $BS_{new}$ 714 are present. The overlap between the coverage areas of $BS_1$ 710 and $BS_3$ 711 is shown by area 713. Here, area 713 is larger than that of are 605 of FIG. 6A. In this example, prior to the introduction of the new base station $BS_{new}$ 714, the base stations $BS_1$ 710 and $BS_3$ 711 always hand off mobile stations between them. However, after introduction of the new base station, each is moved into the other's "candidate" category.

FIG. 8B shows the relationships between the three base stations $BS_1$ 710, $BS_2$ 712, and $BS_3$ 711 before and after the introduction of $BS_{new}$ 714. Prior to the introduction of $BS_{new}$ 714, $BS_1$ 710 had both $BS_2$ 712 and $BS_3$ 711 in its "always" (also referred to as "active") list. $BS_2$ 712 had $BS_3$ 711 and $BS_1$ 710 in its always list. $BS_3$ 711 had $BS_1$ 710 and $BS_2$ 712 in its always list. These relationships are due to, at least in part, to the overlap in coverage areas.

After the introduction of $BS_{new}$ 714, the relationships between the base stations are modified to reflect the new topology of coverage areas and overlap. Now, $BS_{new}$ 714, $BS_1$ 710 has both $BS_2$ 712 and $BS_{new}$ 714 in its always list and $BS_3$ 711 in its "candidate" list. $BS_2$ 712 has $BS_{new}$ 714, $BS_3$ 711 and $BS_1$ 710 in its always list. $BS_3$ 711 has $BS_1$ 710 in its candidate list and $BS_2$ 712 and BS new 714 in its always list. $BS_{new}$ 714 has $BS_1$ 710, $BS_2$ 712, and $BS_3$ 711 in its always list.

Figure 4:
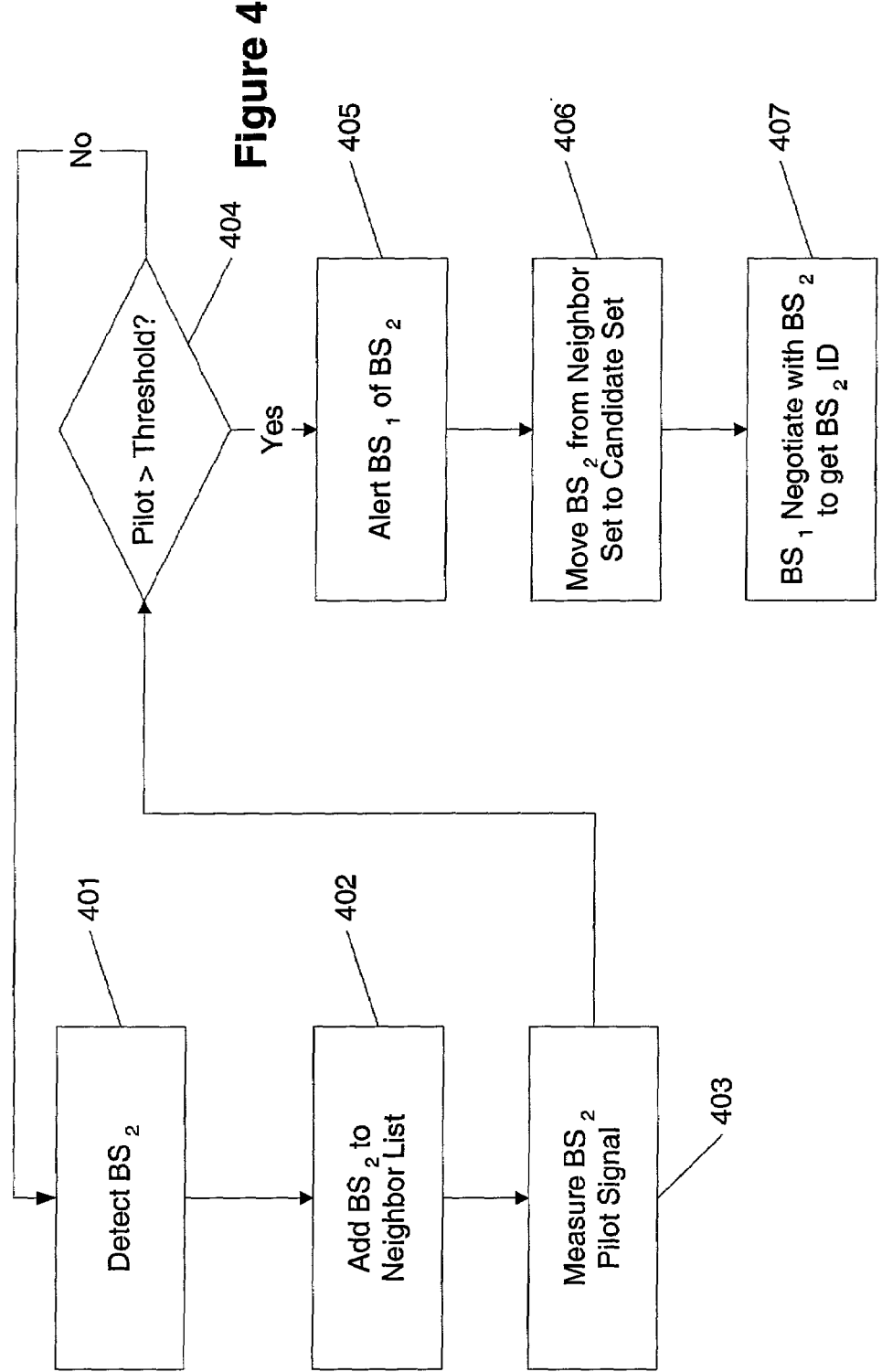
FIG. 4 shows a method for handing off a mobile station between base stations in accordance with embodiments of the present invention.

FIG. 4 shows a method for handing off a mobile station between base stations in accordance with embodiments of the present invention. Once the new base station has been set up, it acts with other base stations to assist in handing off mobile stations. The mobile station monitors for pilot signals from base stations. In step 401, the mobile station detects a base station's ($BS_2$) pilot signal. In step 402, the mobile station adds the base station to its neighbor list. The neighbor list is a list maintained by the mobile station that indicates which base stations are in the geographic area of the mobile station. In step 403, the mobile station measures the strength of the pilot signal from the detected base station $BS_2$. The mobile station compares the strength of the pilot to a predetermined threshold. If the strength of the pilot signal does not exceed the threshold, the mobile station returns to step 401. Otherwise, it alerts its source base station (base station $BS_1$, for example) of the new base station (here, $BS_2$). Next, in step 406, the mobile station moves the new base station $BS_2$ from the neighbor set to the candidate set. The candidate set is the set of neighboring base stations that the mobile station is attempting to communicate with using a soft handoff. Next, in step 407, base station $BS_1$ negotiates with $BS_2$ to get the identification information from $BS_2$ to allow the mobile station to begin communicating with $BS_2$. The information retrieved by $BS_1$ may include the Walsh code of $BS_2$.

With respect to the threshold level, one may also use a non-predetermined threshold or a varying threshold to adapt to changing levels. Also one may determine the threshold to use by looking at the outage area where signal quality is poor or no signal is received or transmitted.

In alternative embodiments, step 407 may be pushed from the base station to the mobile. In other words, the mobile station may negotiate directly with $BS_2$ to get the identification information.

The mobile base station may also receive IP-layer information from the target base station $BS_2$. Such information may include, for example, the new IP address (if needed) to use the new cell inside the area served by $BS_2$ and other IP-layer resources. (e.g., IP-layer service class and capacity) available for the handoff call.

Figure 5:
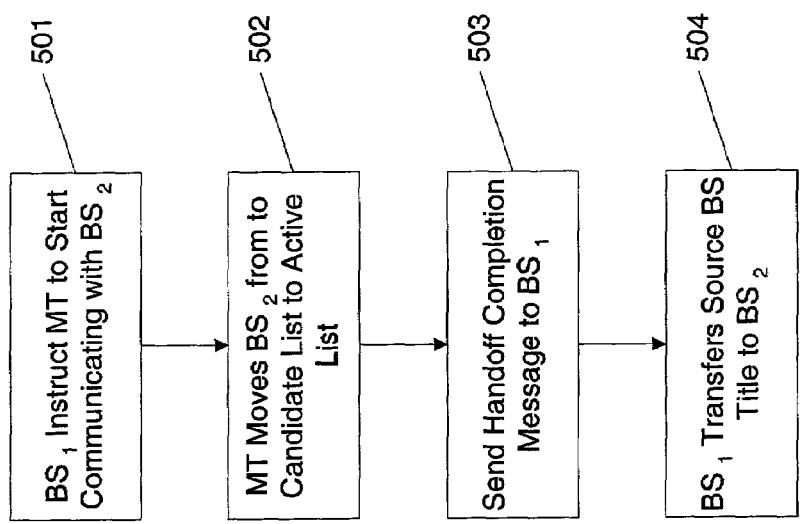
FIG. 5 shows a method for handing off a mobile station between base stations further to that of FIG. 4 in accordance with embodiments of the present invention.

FIG. 5 shows a method for handing off a mobile station between base stations further to that of FIG. 4 in accordance with embodiments of the present invention. In step 501, $BS_1$ instructs the mobile station MT to start communicating with $BS_2$. In step 502, the mobile station moves $BS_2$ from the candidate list to the active list and begins communicating with $BS_2$. In step 503, the mobile station sends a handoff completion message to $BS_1$ indicating that the mobile station has successfully started communicating with $BS_2$. This message may be immediately sent or may be delayed to ensure the communication with $BS_2$ is well established. Once received, or after a predetermined delay to ensure that the communication is well established, $BS_1$ transfers its source BS title to $BS_2$. A source base station title indicates that it is the primary base station serving a mobile station.

FIG. 9 shows a mobile station in relation to base stations in accordance with embodiments of the present invention. Here, base station 1 901 and base station 2 902 are both communicating with mobile station 905. As mobile station 905 moves, it attempt to make contact with various base stations. At position 905A, the mobile station 905 communicates with BS new 903 on low power. This power level may be detected at base station 2 902. BS new may inform BS 2 902 of this low power use directly or BS 2 902 may determine this level of power consumption on its own.

When the mobile station moves to position 905B, the mobile station attempts to communicate with BS new 903. However, to communicate with this base station, the mobile station needs to use higher power than communicating with BS 1 901 and BS 2 902 (which both use a medium level power). While base station new 903 would want to be included in the candidate or always lists of base stations 1 901 and 2 902, both base stations 901 and 902 (or at least one of them) may refuse to permit base station new to be added to their lists because of the high power use of the mobile terminal. The knowledge of the power consumption may be based on a few mobile stations moving between the base stations or may be based on statistical samples occurring over time. This statistical sampling may occur over time and be provided to some or all of the base stations.

FIG. 10 shows forward path diversity in accordance with embodiments of the present invention. When transitioning between base stations 1001 and 1002, mobile station 1003 may receive information from both base stations. This diversity reception permits greater signal integrity as errors may be eliminated by comparing the received signals. Here, incoming data is received by source base station 1001 and transmitted to both target base station 1002 and mobile station 1003. These transmissions may be done at the same time, during a specified time window or during a greater interval. Base station 1003 retransmits its received information (or at least the payload of the message intended for the mobile station) to the mobile station 1003. Three methods may be used to coordinate the reception of information by the receiver. These three approaches are discussed in relation to FIGS. 13A through 13C.

FIG. 11 shows reverse path diversity in accordance with embodiments of the present invention. Mobile station transmits information to both source base station 1101 and target base station 1102. These transmissions may be done at the same time, during a specified time window or during a greater interval. Target base station then transmits at least the payload of the information from mobile station 1103 to source base station 1101. Source base station receives the information and transmits it to its desired destination.

FIGS. 13A to 13C show various diversity signaling processes in accordance with embodiments of the present invention. For simplicity, FIGS. 13A to 13C are described in relation to the base stations transmitting information to the mobile station. It will be appreciated that the same diversity system may be used in the reverse path. In FIG. 13A, the base stations transmit the information to the mobile station at the same time. To make this possible, the source base station first transmits the package of information for the mobile station to the target base station with an indication of the item the package is to be transmitted to the mobile station. At that time (here, $t_1$), both the source base station and the target base station transmit the package to the mobile station.

In FIG. 13B, the target base station transmits the package within a predefined time window to the mobile station. While source base station 1 transmits at time $t_1$, target base station 2 transmits at time $t_2$. When transmitting the package to the target base station 2, the source base station 1 may include an indication of the time window during which the package is to be transmitted to the mobile station. Further, the length of the window may be predefined so the actual window time may not need to be transmitted as it is known by the target base station. This approach has the advantage of leveling peak transmission loads on target base stations as it permits the target base stations to shift slightly ahead or back the transmission time of the package. Other advantages may be realized.

In FIG. 13C, the packages from source base station 1 and target base station 2 are transmitted without a predetermined window or time set. The mobile station identifies and matches the received packages with each other (package A with A, package B with B). The mobile station has cache memory. Mobile station saves received two (BS 1 and BS 2) sets of data (after decision or rear waveforms) in cache memory. The mobile station compares the saved data sets from each BS with pattern matching to find the candidate set of data (after decision or rare waveforms). Here, the mobile station executes selection diversity or rake reception with selected candidate set of data. If errors are detected between the packages or other differences, the mobile station may attempt to correct these errors through known methods. After this procedure, the mobile may check the CRC with the generated data to confirm that the generated data is correct. With this pattern matching combining method, there is more room for the timing requirements for data forwarding from source BS to target BS.

The reverse path diversity of FIG. 11 may function the same as the forward path diversity of FIG. 10 of described above in FIGS. 13A–C. For example, the target base station sends received data to the source BS with encapsulation and time stamp. Source base station conducts selection diversity with frame by frame or bit by bit with majority vote then a CRC check. Target base station sends received waveforms to the source base station to use rake receiver at the source base station (with encapsulation and time stamp). Data streams over the reserve links will be delivered to the serving base station and combined by the serving base station at the radio-dependent link layer before the data is passed upwards to the radio-independent link layer.

The above-described system may be implemented in an IP network. Each packet may have both an IP address and a message. The system may replace IP addresses as needed or encapsulate IP addresses (for example the IP address of a mobile station) when transmitting a message to another IP address (for example, the IP address of the target base station).

Furthermore, the system described above provides the benefits of eliminating the extra handoff latency or service establishment latency caused by changing IP addresses when mobile stations move into new cells. This is because source base station assisted soft hand off eliminates the needs for a mobile to change its IP address while it is inside a soft handoff region. If a mobile station has to use a different IP address when it moves out of a soft handoff region into a new cell, the mobile may start the process of obtaining its new IP address while it is still inside the soft handoff region. If the mobile succeeds in obtaining the new IP address before it exits the soft handoff region, the mobile station may start to use the new address immediately after the mobile station leaves the soft handoff region. This approach eliminates the extra latency of connection establishment caused by IP address change. The mobile station may also choose to start to use the new IP address while it is still inside the soft handoff region.

Other embodiments are possible and considered within the scope of the invention.

We claim:

1. A system for setting up base stations in relation to existing base stations comprising:

a first base station having a receiver, a processor, and a transmitter, wherein said receiver receives signals from existing base stations, said processor adds said existing base stations to a list of base stations, said list of base stations includes at least two base stations, and said transmitter transmits said list to other base stations, wherein said existing base station may or may not modify their list of base stations.

2. The system according to claim 1, wherein said list includes candidate base stations and always handoff base stations.

3. The system according to claim 2, wherein said candidate base stations are base stations that are considered to receive some, but not all traffic between said base stations.

4. The system according to claim 2, wherein said always base stations are base stations that are considered to receive all traffic between said base stations.

5. The system according to claim 1, wherein said other base stations approve or disapprove of said list from said first base station.

6. The system according to claim 1, wherein said receiver receives confirmation from said other base stations.

7. The system according to claim 1, wherein said at least two base stations include said first base station and at least another base station.

8. The system according to claim 1, wherein said at least two base stations include a second and a third base station.

9. The system according to claim 1, wherein said list is grouped according to one of three types of relationships between said base stations.

10. The system according to claim 9, wherein said three types of relationships relate to an order in which said base stations are handled.

11. The system according to claim 9, wherein said three types of relationships are based on a power level of a transmission from said base stations.

12. The system according to claim 9, wherein said three types of relationships are based on a sync portion of a transmission from said base stations.

13. The system according to claim 9, wherein said three types of relationships are based on a loading factor of said base stations.

14. The system according to claim 1, wherein said list includes never handoff base stations.

15. The system according to claim 14, wherein said never base stations are base stations that are never considered to receive traffic between said base stations.

16. A method for setting up a base station comprising the steps of:
   determining neighboring base stations;
   monitoring signals associated with said base stations;
   determining how said signals compare with a signal generated by said base station;
   ordering said base stations into a list; and,
   transmitting said list to said base stations,
   where said base stations may or may not modify their list of base stations.

17. A method for setting up a base station comprising the steps of:
   a first base station requesting a second base station to add said first base station to said second base station's list of base stations;
   said second base station accepting or rejecting said first base station's request;
   responsive to said accepting or rejecting step, adding said first base station to said second base station's list of base stations;
   said second base station returning said acceptance or rejection to said first base station; and,
   said first base station confirming said acceptance or rejection.

18. The method of claim 17, wherein said requesting step involves sending a list of base stations from said first base station to said second base station.

19. The method of claim 17, wherein said returning step involves returning said second base station's list of base stations to said first base station.

20. The method of claim 17, wherein said confirming step involves agreeing on a predetermined staffing time to begin soft handoff.

* * * * *

UNITED STATES PATENT AND TRADEMARK OFFICE
CERTIFICATE OF CORRECTION

| | | |
|---|---|---|
| PATENT NO. | : 7,162,247 B2 | Page 1 of 1 |
| APPLICATION NO. | : 09/835855 | |
| DATED | : January 9, 2007 | |
| INVENTOR(S) | : Baba et al. | |

It is certified that error appears in the above-identified patent and that said Letters Patent is hereby corrected as shown below:

On the Title Page

Item (74), under "Attorney, Agent or Firm", in Column 2, Line 1, delete "Ltd" and insert -- Ltd. --, therefor.

Item (56), under "OTHER PUBLICATIONS", in Column 2, Line 17, delete "wthin" and insert -- within --, therefor.

In the Specification

In Column 7, Line 45, delete "are" and insert -- area --, therefor.

In the Claims

In Column 11, Line 6, in Claim 1, delete "station" and insert -- stations --, therefor.

In Column 12, Line 38, in Claim 20, delete "staffing" and insert -- starting --, therefor.

Signed and Sealed this
Second Day of December, 2014

Michelle K. Lee
*Deputy Director of the United States Patent and Trademark Office*